(12) United States Patent
Vojnovic et al.

(10) Patent No.: US 8,695,009 B2
(45) Date of Patent: Apr. 8, 2014

(54) ALLOCATING TASKS TO MACHINES IN COMPUTING CLUSTERS

(75) Inventors: Milan Vojnovic, Cambridge (GB); Amin Karbasi, Lausanne (CH)

(73) Assignee: Microsoft Corporation, Redmond, WA (US)

( * ) Notice: Subject to any disclaimer, the term of this patent is extended or adjusted under 35 U.S.C. 154(b) by 229 days.

(21) Appl. No.: 13/089,081

(22) Filed: Apr. 18, 2011

(65) Prior Publication Data

US 2012/0266176 A1 Oct. 18, 2012

(51) Int. Cl.
*G06F 9/46* (2006.01)

(52) U.S. Cl.
USPC .......................................... 718/104

(58) Field of Classification Search
None
See application file for complete search history.

(56) References Cited

U.S. PATENT DOCUMENTS

| | | | | |
|---|---|---|---|---|
| 5,325,525 | A * | 6/1994 | Shan et al. | 718/104 |
| 6,360,243 | B1 * | 3/2002 | Lindsley et al. | 718/103 |
| 6,393,026 | B1 * | 5/2002 | Irwin | 370/401 |
| 6,430,593 | B1 * | 8/2002 | Lindsley | 718/103 |
| 6,785,734 | B1 * | 8/2004 | Blasiak et al. | 709/238 |
| 7,024,671 | B2 * | 4/2006 | Yamashita | 718/102 |
| 7,146,424 | B2 | 12/2006 | Douceur et al. | |
| 7,213,065 | B2 | 5/2007 | Watt | |
| 8,082,273 | B2 * | 12/2011 | Brown et al. | 707/782 |
| 2002/0002578 | A1 * | 1/2002 | Yamashita | 709/105 |
| 2006/0143616 | A1 * | 6/2006 | Koike et al. | 718/102 |
| 2008/0049254 | A1 | 2/2008 | Phan et al. | |
| 2008/0198753 | A1 * | 8/2008 | Choudhury et al. | 370/242 |
| 2008/0233966 | A1 * | 9/2008 | Scheim et al. | 455/452.1 |
| 2009/0064160 | A1 * | 3/2009 | Larson et al. | 718/104 |
| 2009/0300134 | A1 | 12/2009 | Smith et al. | |
| 2010/0100877 | A1 | 4/2010 | Greene et al. | |
| 2010/0107173 | A1 * | 4/2010 | Chassin | 718/104 |
| 2010/0115527 | A1 * | 5/2010 | Kotlyar et al. | 718/104 |
| 2010/0131957 | A1 * | 5/2010 | Kami | 718/104 |

OTHER PUBLICATIONS

Chandra, et al., "Dynamic Resource Allocation for Shared Data Centers Using Online Measurements", retrieved on Jan. 24, 2011 at <<http://www-users.cs.umn.edu/~chandra/papers/iwqos03/paper.pdf>>, University of Massachusetts, Department of Computer Science, Technical Report TR02-3, 2002 pp. 1-18.

(Continued)

*Primary Examiner* — Van Nguyen
(74) *Attorney, Agent, or Firm* — Pablo Tapia; Jim Ross; Micky Minhas

(57) ABSTRACT

Allocating tasks to machines in computing clusters is described. In an embodiment a set of tasks associated with a job are received at a scheduler. In an embodiment an index can be computed for each combination of tasks and processors and stored in a lookup table. In an example the index may be include an indication of the preference for the task to be processed on a particular processor, an indication of a waiting time for the task to be processed and an indication of how other tasks being processed in the computing cluster may be penalized by assigning a task to a particular processor. In an embodiment tasks are assigned to a processor by accessing the lookup table, selecting a task for processing using the index and scheduling the selected task for allocation to a processor.

16 Claims, 8 Drawing Sheets

(56) References Cited

OTHER PUBLICATIONS

Gurvich, et al., "Scheduling Flexible Servers with Convex Delay Costs in Many-Server Service Systems", retrieved on Jan. 24, 2011 at <<http://citeseerx.ist.psu.edu/viewdoc/download;jsessionid=4166D601878EBCC130BC5B9098222815?doi=10.1.1.127.4157&rep=rep1&type=pdf>>, Draft (published in Manufacturing and Service Operations Management, vol. 11, No. 2, 2009, pp. 237-253), Dec. 7, 2007, pp. 1-40.

Hamidzadeh, et al., "Dynamic Task Scheduling Using Online Optimization", retrieved on Jan. 24, 2011 at <<http://ieeexplore.ieee.org/stamp/stamp.jsp?tp=&arnumber=888636&userType=inst>> IEEE Transactions on Parallel and Distributed Systems, vol. 11, No. 11, Nov. 2000, pp. 1151-1163.

Isard, et al., "Dryad: Distributed Data-Parallel Programs from Sequential Building Blocks", retrieved on Jan. 24, 2011 at <<http://research.microsoft.com/pubs/63785/eurosys07.pdf>>, ACM, Proceedings of European Conference on Computer Systems (EuroSys), Lisbon, Portugal, Mar. 21, 2007, pp. 59-72.

Isard, et al., "Quincy: Fair Scheduling for Distributed Computing Clusters", retrieved on Jan. 24, 2011 at <<http://www.sigops.org/sosp/sosp09/papers/isard-sosp09.pdf>>, ACM, Proceedings of Symposium on Operating Systems Principles (SOSP), Big Sky, Montana, 2009, pp. 261-276.

Mandelbaum, et al., "Scheduling Flexible Servers with Convex Delay Costs: Heavy-Traffic Optimality of the Generalized cu-Rule", Operations Research, vol. 52, No. 6, 2004, pp. 836-855.

Xu, et al., "Predictive Control for Dynamic Resource Allocation in Enterprise Data Centers", retrieved on Jan. 24, 2011 at <<http://www-users.cs.umn.edu/~chandra/papers/iwqos03/paper.pdf>> IEEE/IFIP Network Operations and Management Symposium (NOMS), Vancouver, Canada, Apr. 2006, pp. 1-13.

Zaharia, et al., "Delay Scheduling: A Simple Technique for Achieving Locality and Fairness in Cluster Scheduling", retrieved on Jan. 24, 2011 at <<http://www.cs.berkeley.edu/~matei/papers/2010/eurosys_delay_scheduling.pdf>>, ACM, Proceedings of European Conference on Computer Systems (EuroSys), Paris, France, Apr. 2010, pp. 265-278.

* cited by examiner

ALLOCATING TASKS TO MACHINES IN COMPUTING CLUSTERS

BACKGROUND

Computing clusters such as data centers, groups of interconnected computers, and distributed computing networks are increasingly used for distributed computing tasks. Tasks may be part of an overall distributed computing task, for example, data may be divided into portions and the portions distributed to different computing devices in a data center. A job may involve processing the data by carrying out tasks at the computing devices. In an example the data which is to be processed may be stored on different computing devices in the data centre.

In order to allocate tasks to machines in a computing cluster decisions need to be made as to how best to allocate the tasks. Automated approaches are typically complex and often only practical for particular types of distributed computing networks with particular operating conditions. Parameters of such automated systems are usually manually configured by operators using empirical data and this is time consuming, complex and error prone.

The embodiments described below are not limited to implementations which solve any or all of the disadvantages of known task allocation systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Allocating tasks to machines in computing clusters is described. In an embodiment a set of tasks which may be associated with a job are received at a scheduler. In an embodiment an index may be computed for each combination of tasks and processors and stored in a lookup table. In an example the index may include an indication of the preference for the task to be processed on a particular processor, an indication of a waiting time for the task to be processed and an indication of how other tasks being processed in the computing cluster may be penalized by assigning a task to a particular processor. In an embodiment tasks are assigned to a processor by accessing the lookup table, selecting a task for processing using the index and scheduling the selected task for allocation to a processor.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a computing cluster, the system described is provided as an example and not a limitation. As those skilled in the art will appreciate, the present examples are suitable for application in a variety of different types of distributed computing systems.

Figure 1:
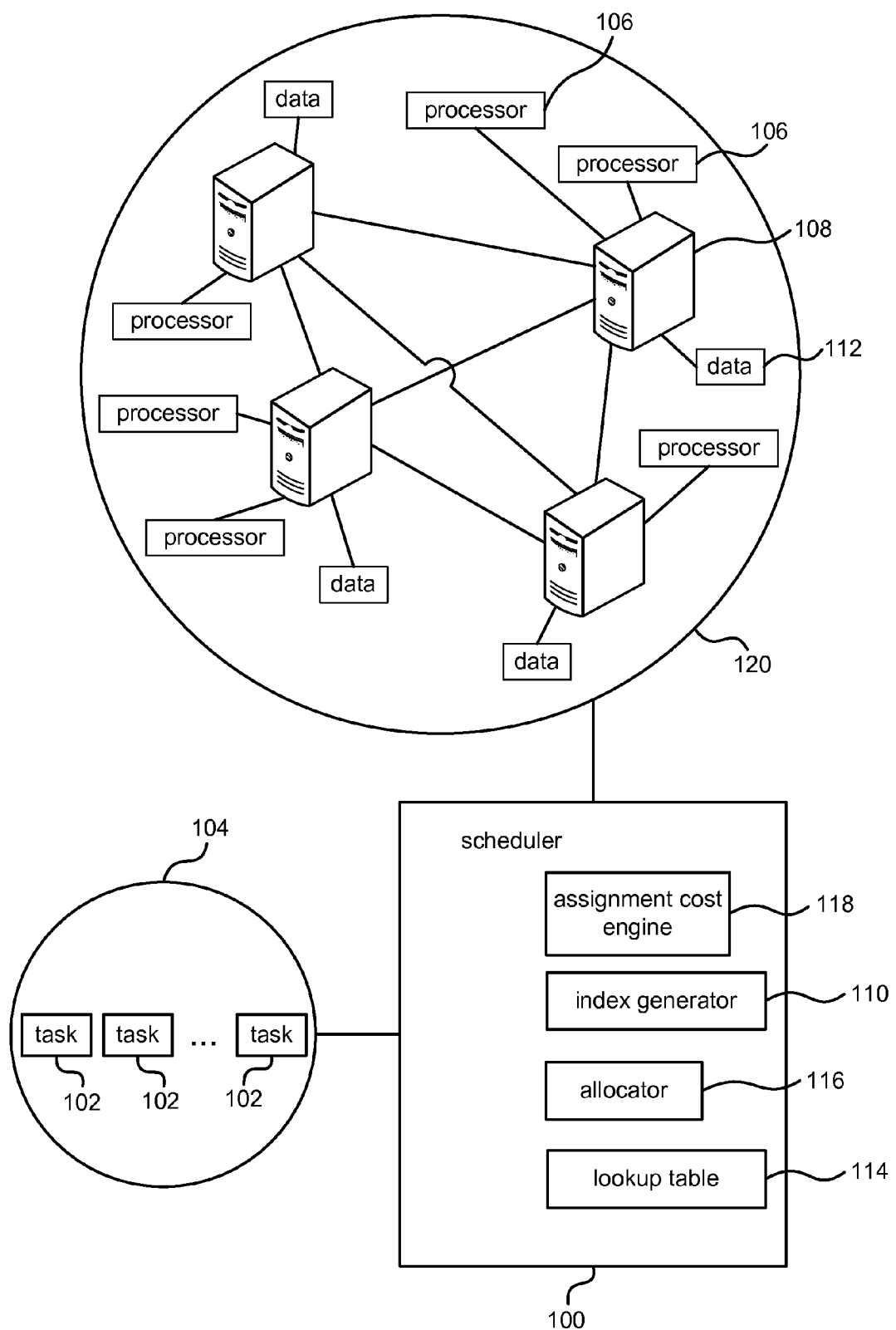
FIG. 1 is a schematic diagram of task scheduling in a computing cluster.

FIG. 1 is a schematic diagram of task scheduling in a computing cluster 120. The computing cluster 120 comprises one or more machines 108 which are located in one or more data centers. The machines are computing devices, for example one or more servers, which are comprised of one or more processors. Each machine may also have one or more data stores. The machines in the cluster are connected by links which may, for example, be network links. The computing cluster may also have one or more routers or network switches to direct traffic between machines in the data centre or between the data centre and the outside world.

A task scheduler 100, which may be located at the cluster, receives jobs 104 which are comprised of a plurality of tasks. In some examples the computing cluster may be a distributed computing cluster. In some embodiments the jobs may be received from other machines within the cluster. In other embodiments the jobs may be received from machines which are external to the cluster. The task scheduler decides which jobs or tasks are to be admitted to a queue for allocation to a processor and processing. Thus, the task scheduler dictates what tasks are to run, when tasks are to be run and the degree of concurrency to be supported at any one time. For example, whether a high or low amount of tasks are to be executed concurrently, and how the split between IO intensive and CPU intensive tasks is to be handled.

Scheduling in clusters can be used to minimize waiting times and ensure that system load is optimized. Schedulers have used ad-hoc heuristic techniques to meet these objectives without solving a clearly defined objective problem, ad-hoc techniques may involve solving complex minimum path problems. Defining a scheduling rule with clearly defined global system objective may reduce the level of computational complexity in the task scheduling problem. In an example the task scheduler may be a greedy scheduler, which may be used so that the amount of time that each processor is idle is minimized while there are still tasks queued to be processed.

The task scheduler 100 assigns tasks 102 for processing to machines in the distributed cluster. A task may be a processing step that is to be completed in order to complete a job 104. In an example a task may comprise processing data 112 which is stored at one or more machines in the cluster. In another example a task may comprise moving data from one location to another within the cluster, for example in an input/output operation.

The task scheduler may allocate tasks so that a fairness objective is met. For example the fairness objective may be that waiting times are minimized and/or that data locality is respected. Data locality may be respected by assigning tasks to machines near the data that needs to be processed. In an example the task scheduler optimizes a global system objective, in contrast to schedulers which a priori use scheduling heuristics in an ad-hoc manner without a clearly defined global objective. A scheduler solving a scheduling rule with a clearly defined objective may maximize data locality.

In an example the machines 108 in the cluster may be connected by a local area network. However this is not essential, the connections between machines may be any appropriate connection for transferring data. A non-exhaustive list of examples of appropriate connections is; Campus Area Network (CAN), Wide Area Network (WAN), wireless network, Public Switched Telephone Network (PSTN). Each machine may be located in a rack of machines. The machines may be of the same specification or different specifications, for example the machines may have a single processor or a plurality of processors, or different RAM memory sizes or storage capacity.

In an example each task 102 may be scheduled for processing by the scheduler to a processor 106 associated with a machine 108 in the computing cluster. In another example the processor 106 may be selected by the scheduler and allocated to a task 102. In an embodiment the scheduler 100 comprises an index generator 110, which is arranged for a task of the plurality of tasks available for allocation to the processor 106, to compute a scheduling index, the index being a measure of one or more costs associated with assigning a task to a particular processor. In an embodiment a scheduling index can be computed for different combination of tasks and processors within the cluster.

In an embodiment the index can be related to a number of costs. The costs may be a measure of the effect of assigning a task to a particular one of the processors. In contrast, a heuristic scheduler typically does not take account of the effect of assigning a task and assumes that each task to be scheduled is independently. In an example the assignment cost can be an indication of the preference for the task to be processed on one or more of the processors. At least some of the tasks may have a preferred processor to be executed on e.g. if data 112 that is needed to complete the task processing is held at a particular machine 108 in the computing cluster it may be preferable for the task to be processed on that machine rather than transferring large amounts of data across a network. In another example preferences may take account of the specification of a particular machine, for example if a task needs a large amount of RAM memory it may be preferable to assign the task for processing to a processor in a machine with excess RAM capacity. In another example, in a large data center, different machines may be owned or hired by different entities and the tasks may be assigned according to ownership of the tasks.

The scheduling index may also be related to a task holding cost. A task holding cost may be an indication of a waiting time of the task prior to processing. For example, the waiting time may be an indication of queue length.

Rather than assuming that each assignment is independent of other assigned tasks, the index may also relate to an externality cost. The externality cost may be an indication of how existing tasks assigned in the computing cluster are penalized if a task is allocated to a particular processor. For example, tasks already being processed may be penalized due to receiving a reduced share of the total available resources or due to increased load on the links between machines in processors. In an example the externality cost may be estimated using a congestion measure at links between processors in the computing cluster, for example using a packet loss rate.

The computed index for each task can be stored in a lookup table 114 at the scheduler or at any other location accessible by the scheduler. The lookup table stores the data in a simple way which is easy for other components of the task scheduler to access. The lookup table 114 can be accessed by an allocator 116, the allocator being arranged to select tasks for allocation to a processor 108 or to select a processor for allocation to a task. The allocator 116 accesses the lookup table 114 prior to serving a job to a processor 108. In an example the allocator 116 selects the task with the largest stored index for allocation to a processor. In another example the allocator 116 may allocate a task in such a way that the costs computed for the remaining jobs can be optimized. For example a task may be allocated in such a way that the waiting time and assignment costs for the remaining jobs are minimized. Using a lookup table to store the index for each task, and using the index to allocate tasks for scheduling, simplifies the scheduling procedure and avoids solving complicated minimum flow cost problems.

In some embodiments the scheduler 100 may optionally include an assignment cost engine 118 which is arranged to dynamically adjust the assignment cost. Automatically adjusting the assignment cost using the assignment cost engine avoids relying on manual adjustment of the costs by system operators. The scheduler can be automatically tuned in order to meet given targets for efficiency and may allow higher utilization of cluster link and processing capacity than in a case where the costs are manually adjusted.

The assignment cost may be adjusted during the operation of the scheduler using information about the topology of the computing cluster and information about traffic arriving at links connecting processors in the computing cluster. For example, the assignment cost engine 118 can be arranged to automatically adjust the assignment cost using a stored parameter relating to the capacity available on each link in the network in order to meet target utilization and a capacity for each of the links in the computing cluster. In an example the assignment cost engine may receive input from a monitor arranged to monitor traffic arriving at links in the computer cluster.

Figure 2:
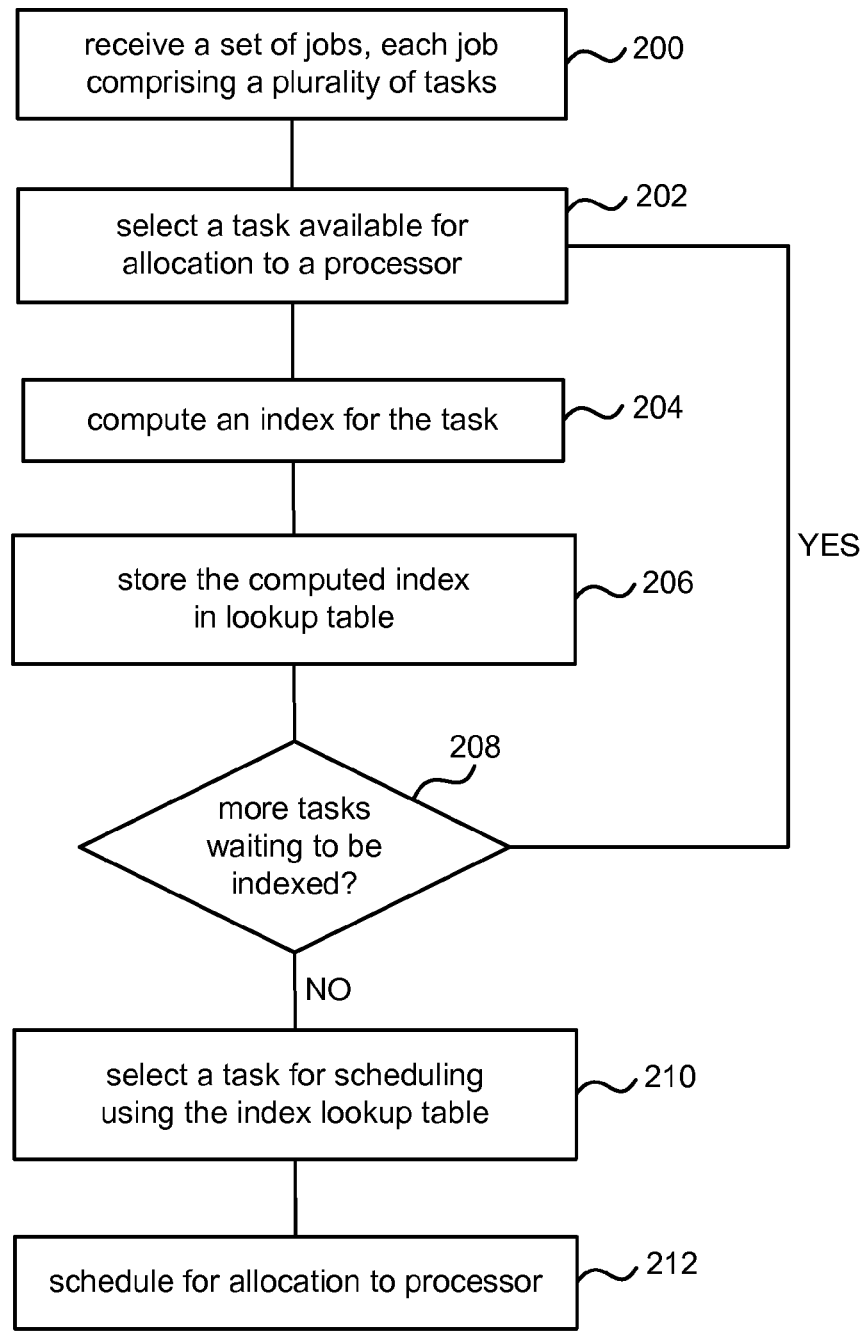
FIG. 2 is a flow diagram of an example method of task scheduling.

FIG. 2 is a flow diagram of an example method of task scheduling. A computing cluster comprises a set of machines M. Each machine M may have one or more processors. At a specified time instance a set of jobs J is received 200 at the computing cluster. A job j∈J consists of a collection of tasks. The system has a set of tasks T and $T_j$ is the set of tasks which are to be executed to complete job j∈J.

A task of job j is selected 202 from the set of tasks available for allocation to a processor and a scheduling index is computed 204 for each processor for the selected task. As described above the index may be a function of at least one of; an assignment cost, a task holding cost or an externality cost. In some embodiments the externality cost may be set to zero such that the computed index is independent of existing tasks being processed at the cluster. In embodiments where the externality cost is non-zero it may be computed using a congestion measure at the links between processors, for example, packet loss rate per link. In an embodiment the task waiting times may be monitored and used to compute a task holding cost. Another example of a task holding cost is the cost of a delay in scheduling the task.

The computed index can be stored 206 in a lookup table, in an example the stored lookup table may be an array or other appropriate data structure. A non-exhaustive list of appropriate types of data structure is; linked list or associative array. In an example the stored index is a measure of the assignment cost for each pair of tasks and processors. In other embodiments additional information may also be included in the index stored in the lookup table.

If more tasks associated with the execution of the set of jobs received at the processor are waiting 208 to be indexed the procedure of; selecting 202 a task, computing 204 and index and storing 206 the index in a lookup table, may be repeated for the remaining tasks. A task is selected 208 for scheduling by accessing the stored index lookup table to determine an association of a task and a processor which has a suitable scheduling index and then scheduling the task for allocation to the processor 210. In an embodiment the index lookup table is recomputed each time a new set of jobs is received at the scheduler for allocation to a processor, rather than recomputed each time a task is allocated. Re-computing the index lookup table each time jobs are received rather than each time tasks are allocated reduces the computational cost of the procedure while still providing an accurate indexing for the scheduler.

Figure 3:
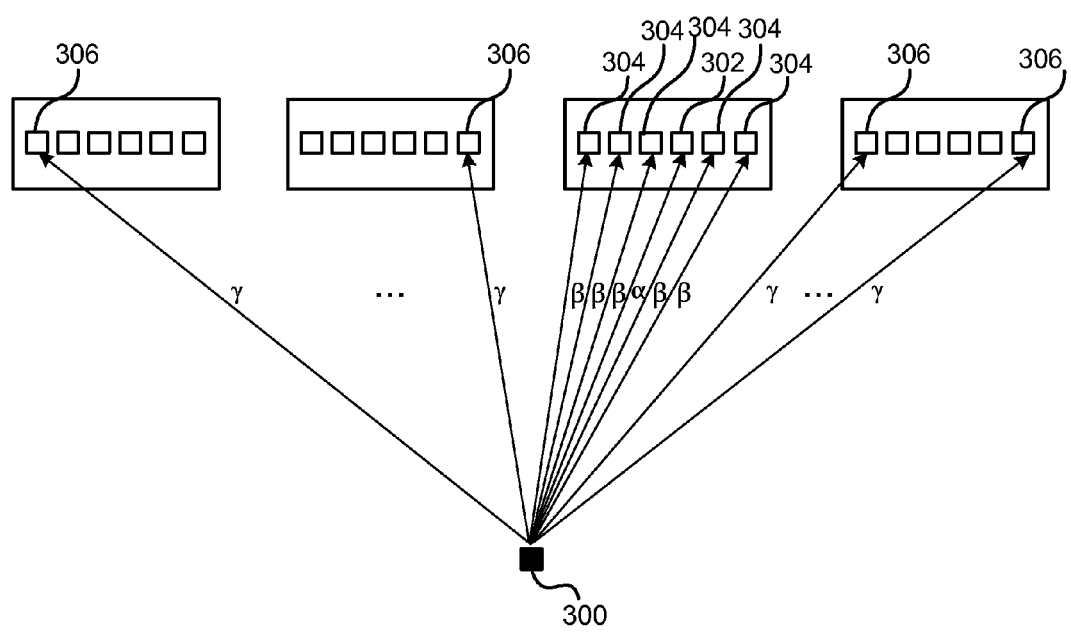
FIG. 3 is a schematic diagram of the cost of assigning tasks to different machines.

FIG. 3 is a schematic diagram of the cost of assigning tasks to different machines. In an example a task k 300 is of type i. For example, if I is a finite set of task types such that each task is of exactly one type from this set, for an assignment of a task of type i∈I to a machine m∈M there is an assignment cost $c_{i,j} \geq 0$. These assignment costs express a preference of some tasks to be processed on a particular machine or within a particular rack of machines as described above. In an embodiment task k 300 is a task that is associated with processing data stored on machine i 302. The assignment cost of task k 300 to machine i is α if assigned to machine i, where α is the lowest possible assignment cost. The assignment cost of task k 300 is β if assigned to another machine 304 in the same rack as machine i, where β is a moderate assignment cost and γ if assigned to a machine 306 not in rack of machine i where γ is a high assignment cost. Each task may have a preference for execution on a different machine.

For example α<β<γ may be some fixed constants which describe the preference for a task to be assigned to a machine. In an example the preference is for task k 300 to be processed at a processor in machine i 302 where the relevant data is stored. However, assigning the task to a processor in a machine in the same rack as machine i 302 may still inccur a relatively low assignment cost as the data is stored nearby. However, the assignment cost of task k 300 to a machine will increase with the distance of the machine to the stored data. Therefore in order to optimize the assignment cost the task may be assigned to a processor at or near machine i 302, if available.

The set of feasible assignments X is defined as follows. An assignment $x \in \{0,1\}^{|T| \times |M|}$ is said to be feasible if every task is assigned to at most one machine and every machine is assigned at most one task, i.e.

$$\sum_{k \in T} x_{k,m} \leq 1 \text{ for every } m \in M \qquad (1)$$

$$\sum_{m \in M} x_{k,m} \leq 1 \text{ for every } k \in T. \qquad (2)$$

Inter job resource allocation fairness may be realized by a job scheduling policy φ which determines the least number of machines $m_j \geq 0$ that at each scheduling instance are allocated to a job j∈J. At every instance, it holds that at least the total number of machines available for allocation to a job is less than or equal to the total set of machines $$\sum_{j \in J} m_j \leq |M|,$$

for example.

The job scheduling policy may, in an example be that the total number of machines available for allocation to a job is less than the total set of machines $$\sum_{j \in J} m_j < |M|,$$

in order to mitigate a sticky slot problem. In an example the sticky slot problem can described as follows. Suppose that the set of jobs is fixed and that over a time interval each job j is allocated a quota $m_j$ such that $$\sum_{j \in J} m_j = |M|$$

and at each instance of this time interval the number of unfinished tasks of a job j is at least $m_j$. In this case, whenever a machine m finishes processing of its allocated job j, the scheduler assigns a task of job j to this machine. As a result, the assignment of tasks over machines is partitioned such that tasks of a job j are assigned to machines in the set $M_j \subseteq M$ where the sets $M_j$, j∈J are disjoint and $\cup_{j \in J} M_j = M$.

Figure 4:
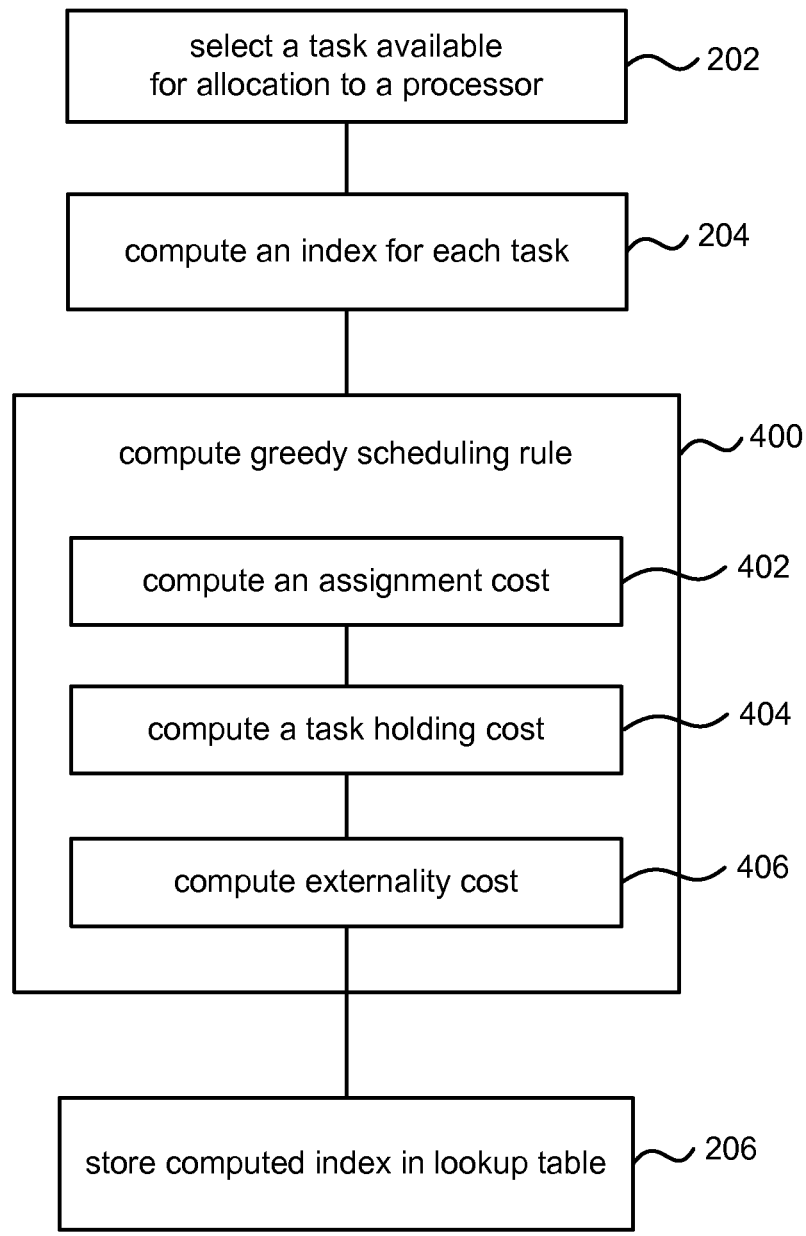
FIG. 4 is a flow diagram of an example method of computing a scheduling index using a greedy scheduling rule.

FIG. 4 is flow diagram of an example method of computing a scheduling index using a greedy scheduling rule. As described above with reference to FIG. 2 a task associated with job j is selected 202 from the set of tasks available for allocation to a processor and a scheduling index is computed 204 for the selected task. In an embodiment the index is computed using a greedy scheduling rule 400

In an embodiment computing 204 the scheduling index using the greedy scheduling rule comprises computing a global scheduling objective which takes account of the various costs of assigning a task to a particular processor. A cost rate can be computed that captures both task assignment costs 402 and task holding cost 404, the cost rate being defined by:

$$C(Q, x) = \sum_{i \in I} C_i(Q_i) + \sum_{i \in I} \sum_{m \in M} c_{i,m} \mu_{i,m}(x) x_{i,m} \qquad (3)$$

where $Q_i$ is the number of tasks of type i and $C_i(\cdot)$ is the holding cost 404. In an example the holding cost can be considered as a continuous, increasing and convex function, for every task type i. For example, a quadratic cost function $C_i(q)=\alpha_i q^2$ for a constant $\alpha_i>0$. In an embodiment, the general class of functions $C_i(q)=\alpha_i q^{1+\delta}$, for every $\delta>0$ satisfies these conditions.

The assignment cost 402 is denoted by $c_{i,m}$ for a task $x_{i,m}$. For a given task assignment $x \in X$, the processing rate of a task of type i at a machine m is denoted by $\mu_{i,m}(x)$.

The scheduling rules determine the assignment $x(t) \in X$, for $t \geq 0$ that minimizes the cumulative cost, for a given time $T \geq 0$ the cumulative cost being given by, $$C(T) = \int_0^T C(Q(t), x(t))\,dt. \quad (4)$$

In an embodiment the greedy scheduling rule 400 is a non pre-emptive scheduling rule. At each scheduling instance an assignment is selected that maximizes the expected decrement of the instantaneous cost as given by equation 3. In an example where a machine $m \in M$ has finished processing of a task, a task may be allocated to machine m such that the expected decrement of the instantaneous cost rate is maximized. In an example the instantaneous cost rate is given by the partial differential of the cost rate with respect to a task $x_{i,m}$:

$$\frac{\partial}{\partial x_{i,m}} C(Q, x) = -\{\mu_{i,m}[C_i'(Q_i) - c_{i,m}] + G_{i,m}(Q, x)\}$$

In the above equation $G_{i,m}(Q,x)$ is the externality cost 406. The externality cost captures the effect of assigning a task of type i to machine m on the processing rates of the running tasks in the cluster, by rearranging the above equation so that:

$$G_{i,m}(Q, x) = \sum_{j \in I} \sum_{l \in M} [C_j'(Q_j) - c_{j,l}] x_{j,l} \frac{\partial \mu_{j,l}}{\partial x_{i,m}} \quad (5)$$

A task of type i(t) can therefore be allocated to machine m according to a scheduling rule 400, for example, by optimizing the following rule which captures the processing rate of the task, the task assignment cost 402, the task holding cost 404 and the externality cost 406:

$i(t) \in \text{argmax}_{i \in I}\{\mu_{i,m}(\mu_{i,m}(x(t))[C_i'(Q_i(t))-c_{i,m}]+ G_{i,m}(Q(t),x(t)))\}.$ In an embodiment, the scheduling rule 400 is a general rule, which under certain conditions may be asymptotically optimal with respect to minimizing the instantaneous cost and the cumulative cost. The index computed for pairs of tasks and processors using the scheduling rule 400 and may be stored 206 as the scheduling index in the lookup table for each pair of tasks and processes.

In an example where processing rates $\mu_{i,m}$ are assumed to be constant, i.e. independent of the task assignment x, then $G_{i,m}(Q,x)=0$, for every i and m, and the scheduling rule simplifies to:

$i(t) \in \text{argmax}_{i \in I}\{\mu_{i,m}[C_i'(Q_i(t))-c_{i,m}]\}.$

In another example where for each machine m the task assignment cost $c_{i,m}$ is independent on the task type, the greedy scheduling rule can be simplified to:

$i(t) \in \text{argmax}_{i \in I}\{\mu_{i,m} C_i'(Q_i(t))\}.$

This rule is a generalized cμ-rule and is known to be asymptotically optimal in a heavy-traffic regime.

In some embodiments the task holding cost may also incorporate a waiting time cost and the task holding cost may be replaced in the greedy scheduling rule with:

$$W(T) = \sum_{i \in I} \sum_{n \geq 1} \overline{C}_i(D_i^n) 1_{A_i^n \in [0,T]}$$

where $\overline{C}_i(y) = C_i(\lambda_i y)/\lambda_i$, $A_i^n$ is the arrival time and $D_i^n$ is the waiting time of the n-th task of type i.

Figure 5:
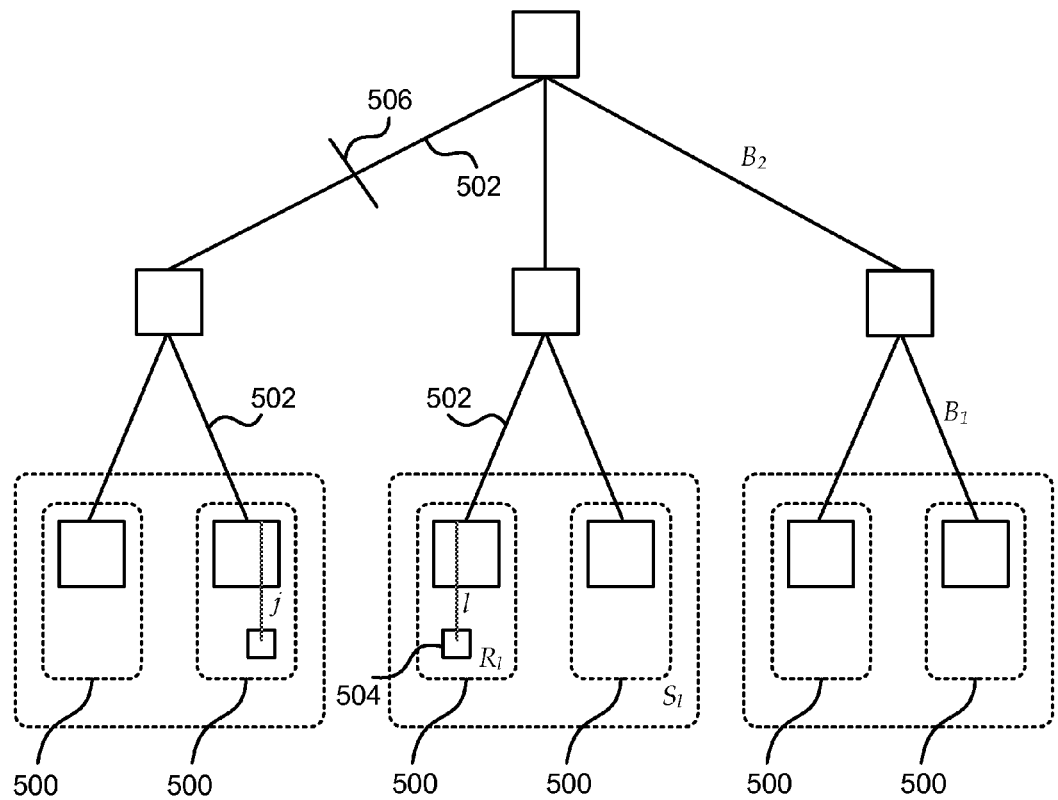
FIG. 5 is a schematic diagram of a computing cluster network topology.

FIG. 5 is a schematic diagram of an example computing cluster network topology. In an example the data centre network comprises a plurality of machines 500 with one or more processors which are connected by a series of links 502. The links may be ethernet links, wireless links or other appropriate links.

The physical network topology can be described as a set of directed edges E such $e \in E$ corresponds to a link 502 of capacity $B_e \geq 0$. Task assignments can be realized by a routing specified by a matrix 504 $R=(R_{(i,m),e})$ where $R_{(i,m),e}$ is the fraction of (i,m)-assignments that results in data transfer through a link $e$ 502. For example, if the data transfer of an assignment (i,m) is through a unique routing path, then matrix 504 $R_{(i,m),e}=1$ for every link $x \, e$ 502 on the path, and $R_{(i,m),e}=0$, otherwise. In some embodiments the network can include one or more congestion monitors 506 which monitor congestion on the one or more links.

In an embodiment, as described above, the externality cost can be an indication of how existing tasks assigned in the computing cluster are penalized if the task is allocated to a processor. The externality cost may be estimated by computing a congestion measure at each link in the cluster. For example, if a task is assigned to a specified machine and routed via a specified set of links this will affect the load and congestion on those links.

Figure 6:
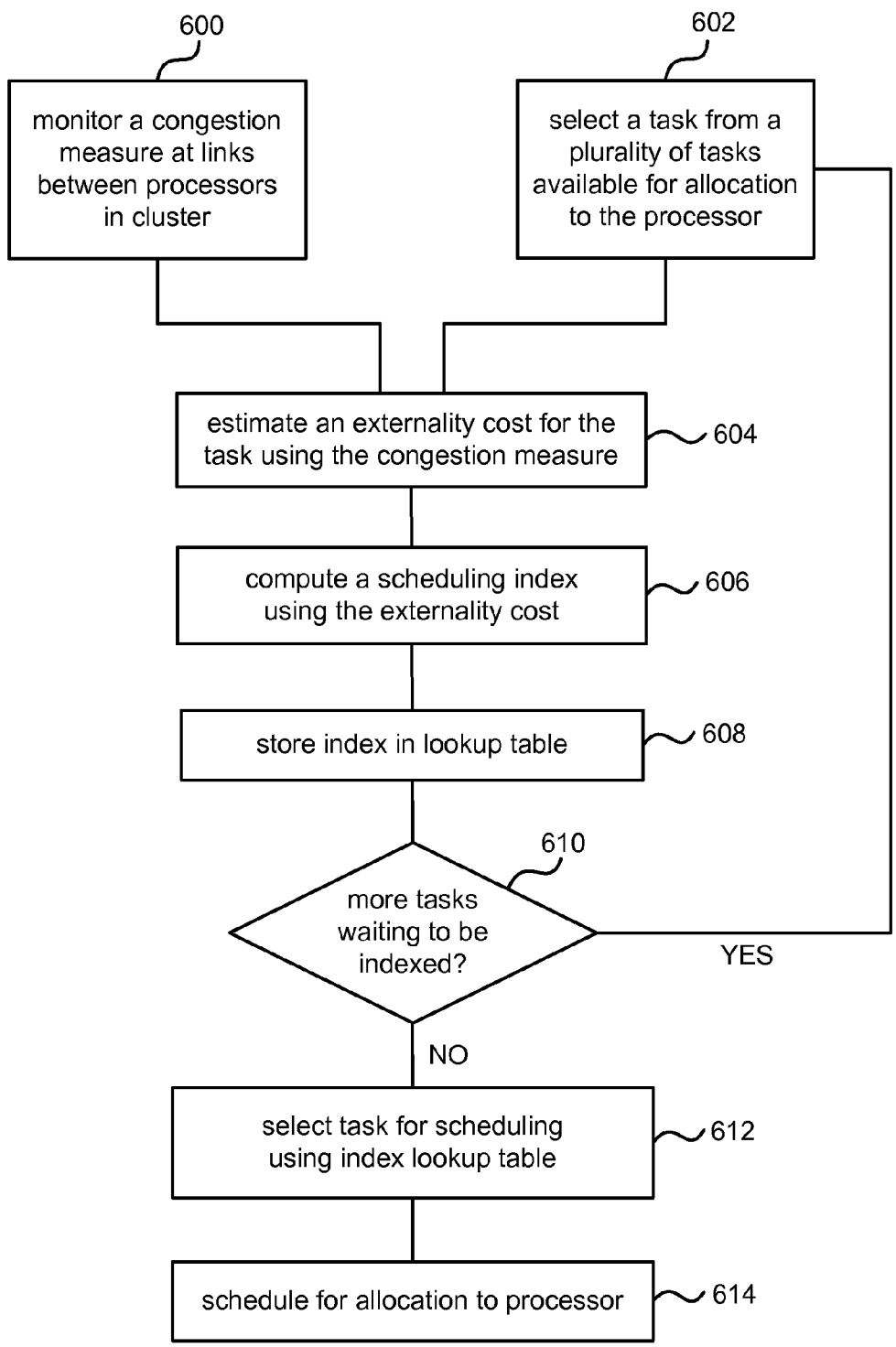
FIG. 6 is a flow diagram of an example method of computing a scheduling index using an externality cost.

FIG. 6 is a flow diagram of an example method of computing a scheduling index using an externality cost which includes a measure of network load and congestion, as described above with reference to FIG. 4. A congestion measure 600 is received at the scheduler. In an embodiment the congestion measure can be received from one or more monitors 506 which monitor congestion at the links between the nodes, in other examples the congestion measure may be a measure of link or capacity utilization.

A task is selected 602 from a plurality of tasks available for allocation to a processor and an estimate 604 of the externality cost is made for the allocation of the task to the processor.

As noted above, the externality cost, which captures the effect of assigning a task of type i to machine m on the processing rates of the running tasks in the system can be given by:

$$G_{i,m}(Q, x) = \sum_{j \in I} \sum_{l \in M} [C_j'(Q_j) - c_{j,l}] x_{j,l} \frac{\partial \mu_{j,l}}{\partial x_{i,m}}.$$

The rate of decrease of the rate $\mu_{j,i}(x)$ by adding an assignment (i,m), $\partial \mu_{j,i}(x)/\partial x_{i,m}$ can be characterised for $j,i \in 1$ and $l,m \in M$. Computing the externality cost is now described in more detail.

Data transfers can be realized by using a congestion control protocol that realizes data transfer rates for given task assignments. In an embodiment $\mu_r$ is the transfer rate of a task assignment with the corresponding data transfer on a route r. R denotes the set of routes and $R_{r,e}$ may be equal to the fraction of instances when a route r traverses a link e. In an example $n_r$ is the number of assignments with data transfer on route r. The data transfer rates $\mu=(\mu_r, r \in R)$ can be considered as an optimum solution of the following (primal) optimization problem, which describes the load on each link in a data centre network:

PRIMAL maximize $\quad \sum_{r \in R} n_r U_r(\mu_r)$ over $\quad \mu_r \geq 0, r \in R$ subject to $\quad \sum_{r \in R} R_{r,e} n_r \mu_r \leq B_e, e \in E.$ where $U_r$ is assumed to be a continuously differentiable concave function, for every $r \in R$.

This solution gives the primal variables as functions of the Lagrange multipliers, which are known as dual variables. The dual of the above problem is:

DUAL minimize $\quad G(p)$ over $\quad p_e \geq 0, e \in E.$ where $$G(p) = \sum_{e \in E} B_e p_e + \sum_{r \in R} n_r \sup_{\mu_r \geq 0} \left\{ U_r(\mu_r) - \sum_{e' \in E} R_{r,e'} p_{e'} \mu_r \right\}.$$

Where $B_e$ represents the capacity of a link, the dual variables $p_e$, $e \in E$, are shadow prices associated with the link constraints in the primal problem and, as noted above $R_{r,e}$ may be equal to the fraction of instances when a route r traverses a link e. Shadow prices are obtained by forming the Lagrangian, using nonnegative Lagrangian multipliers to add constraints (for example link capacity, load) to the objective function, and then solving for at least some of the primal variable values so that the Lagrangian is optimized. In a physical network topology, $p_e$ can be interpreted as the packet loss rate e.

The data transfer rates $\mu$ (i.e. primal variables) and the shadow prices (i.e. dual variables) are related by:

$$x_r = U_r^{-1}(q_r(p)), r \in R \qquad (6)$$

where $$q_r(p) = \sum_{e' \in E} R_{r,e'} p_{e'}$$

and $U_r^{-1}$ denotes the inverse function of the function $U_r$. The optimal shadow prices p are a solution of the following set of equations:

$$\sum_{r \in R} R_{r,e} n_r U_r^{-1}\left( \sum_{e' \in E} R_{r,e'} p_{e'} \right) = B_e, e \in E \qquad (7)$$

From equation (6), we have that for every $r, s \in R$, $$\frac{\partial}{\partial n_s} \mu_r = \frac{1}{U_r''(\mu_r)} \sum_{e \in E} R_{r,e} \frac{\partial}{\partial n_s} p_e. \qquad (8)$$

If p is a vector of dual-optimal shadow prices. A is a matrix of elements defined as follows:

$$a_{e,e'} = -\sum_{r \in R} R_{r,e} R_{r,e'} \frac{n_r}{U_r''(U_r^{-1}(q_r(p)))}, e, e' \in E.$$

For $s \in R$, let $$b_e = R_{s,r} U_s^{-1}(q_s(p)), e \in E.$$

Given a vector of dual-optimal shadow prices p and an arbitrary $s \in R$, $\partial p_e / \partial n_s$, for $e \in E$, is a solution of the following system of linear equations:

$$\sum_{e' \in E} a_{e,e'} \frac{\partial}{\partial n_s} p_{e'} = b_e, e \in E. \qquad (9)$$

This can be shown by taking the partial derivative with respect to $n_s$ on both sides of (7) to obtain, for every $e \in E$, $$R_{s,e} U_s^{-1}(q_s(p)) + \sum_{r \in R} R_{r,e} n_r U_r^{-1\prime}(q_r(p)) \sum_{e' \in E} R_{r,e'} \frac{\partial}{\partial n_s} p_{e'} = 0.$$

The result follows by noting that $U_r^{-1\prime}(q_r(p)) = 1/U_r''(U_r^{-1}(q_r(p)))$ and simple rearrangements.

Therefore for every given assignment $x \in X$, the negative externality term can be estimated from the shadow prices associated with links of the physical network topology $p_e$, $e \in E$. In an example, the effect of adding an assignment on the data transfer rates can be estimated using (8) where the derivatives of the shadow prices are a solution of the linear system (9).

The externality cost can be used to compute 606 the scheduling index as described above which is stored 608 in a lookup table. If more tasks are waiting 610 to be indexed, then for each task in the plurality of remaining tasks a task is selected 602, an externality cost is estimated 604 and the scheduling index computed 608 and stored in a lookup table.

A task can be selected 612 for scheduling using the index lookup table and scheduled for allocation 614 according to a stored index in the table.

Figure 7:
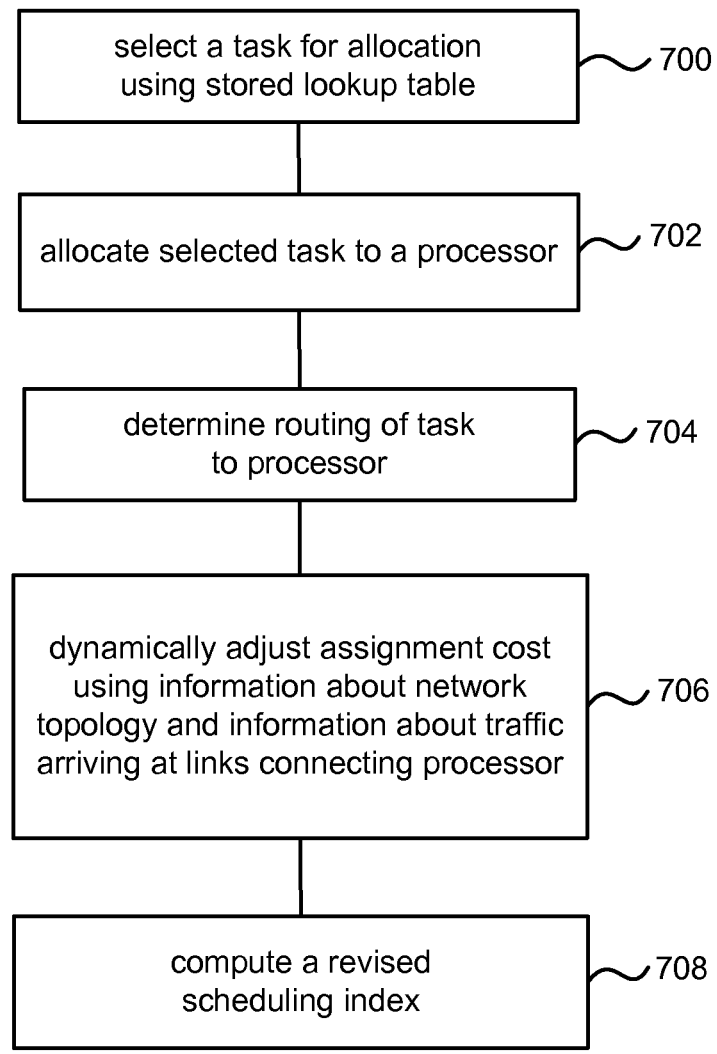
FIG. 7 is a flow diagram of an example method of dynamically adjusting an assignment cost.

FIG. 7 is a flow diagram of an example method of dynamically adjusting an assignment cost. The global scheduling objective described above is defined as a joint optimization of the holding and assignment costs under assumption that the assignment costs can be fixed. In some embodiments these assignment costs are periodically manually adjusted by system operators based on the observed traffic intensity on the physical network topology.

In embodiments where the cost parameters are adjusted manually by a system operator or administrator, manual adjustment may not be carried out regularly enough to allow tuning of the system according to current loads. If cost parameters are not adjusted regularly it may mean that link or system capacity is underused and tasks are not processed as quickly as possible. Using dynamic allocation to automatically adjust the parameters according to current task assignments allows the cost parameters to be adjusted according to the instantaneous system load.

In an embodiment a task is selected 700 for allocation using the stored lookup table and allocated 702 to a selected processor as described above. The routing 704 of the task and data associated with the task through the network links will affect the capacity of those links and the routing may be taken into account in the assignment and holding costs.

In an embodiment the assignment costs may be dynamically adjusted to meet given target utilizations of the links of the physical network topology or other targets. The assignment costs are adjusted 706 dynamically. In an example time is assumed to be discrete, each link 502 e of the physical network topology can be associated with a target utilization $\rho_e \in [0,1]$ and a control variable $q_e[t]$ at a discrete time slot t. For every link e, the control variable $q_e$ can be adjusted, for a fixed $\gamma > 0$ according to:

$$q_e[t+1] = \max\{q_e[t] + \gamma[\lambda_e[t] - \rho_e B_e], 0\}, e \in E$$

where $\lambda_e[t]$ is the arrival traffic to link e in the time slot t. The value of the control variable for each link can be stored. The assignment costs can be adjusted by summing the stored control variables for each link in the routing according to:

$$c_{i,m}[t] = \sum_{e \in E} R_{(i,m),e} q_e[t], i \in I, m \in M.$$

where $c_{i,m}$ is the assignment cost for a task i in the set of tasks $i \in I$ to be assigned to a machine in the set of machines $m \in M$.

The updated assignment costs can be used to compute 708 a revised scheduling index, which accounts for network load and utilization, for each pair of tasks and processors when new jobs are received at the scheduler for allocation to the processor.

Figure 8:
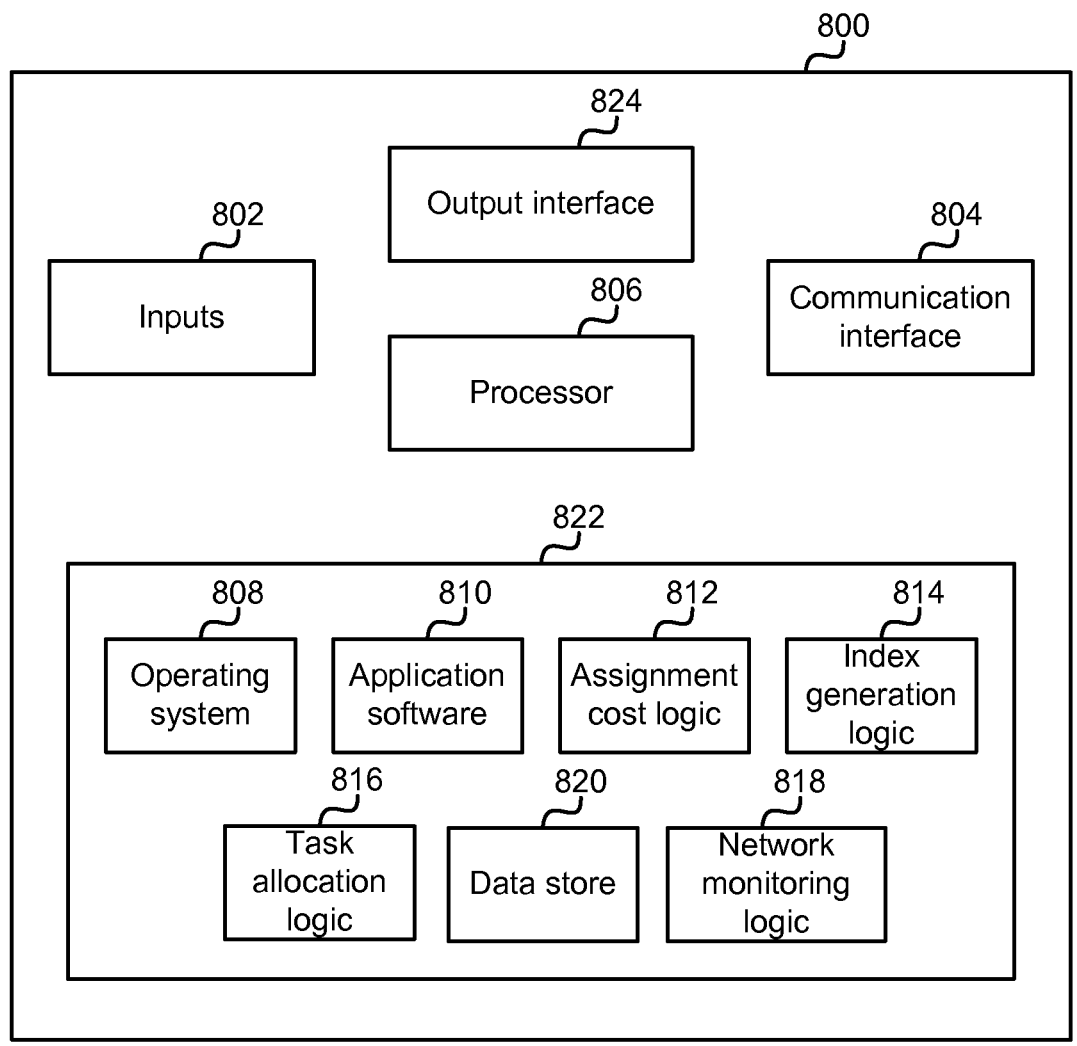
FIG. 8 illustrates an exemplary computing-based device in which embodiments of a task scheduling engine may be implemented.

FIG. 8 illustrates various components of an exemplary computing-based device 800 which may be implemented as any form of a computing and/or electronic device, and in which embodiments of allocating tasks to machines in computing clusters may be implemented.

The computing-based device 800 comprises one or more inputs 802 which are of any suitable type for receiving media content, Internet Protocol (IP) input, jobs, tasks, parameter, data or other appropriate content. The device also comprises communication interface 804 which may be a serial communication interface, parallel communication interface or other appropriate interface.

Computing-based device 800 also comprises one or more processors 806 which may be microprocessors, controllers or any other suitable type of processors for processing computer executable instructions to control the operation of the device in order to index tasks arriving at the device and schedule the tasks for allocation to the one or more processors. In some examples, for example where a system on a chip architecture is used, the processors 806 may include one or more fixed function blocks (also referred to as accelerators) which implement a part of the method of allocating tasks in hardware (rather than software or firmware). Platform software comprising an operating system 808 or any other suitable platform software may be provided at the computing-based device to enable application software 810 to be executed on the device.

Further software that can be provided at the computing-based device 800 includes assignment cost logic 812 (which implements the techniques described for computing the assignment cost), index generation logic 814 (which implements techniques of computing an index for each combination of tasks and processors), task allocation 816 (which allocates tasks for scheduling at a processor) and network monitoring logic 818 (which monitors congestion and utilization of components in the network). A data store 820 is provided to store data such as the training parameters, probability distributions, and analysis results.

The computer executable instructions may be provided using any computer-readable media that is accessible by computing based device 800. Computer-readable media may include, for example, computer storage media such as memory 822 and communications media. Computer storage media, such as memory 822, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 822) is shown within the computing-based device 822 it will be appreciated that the storage may be distributed or located remotely and accessed via a network or other communication link (e.g. using communication interface 822).

An output is also provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of scheduling a task to a processor in a computing cluster comprising a plurality of processors, the method comprising:
   for each of a plurality of tasks available for allocation to the processor;
      computing an index related to an assignment cost for the task, the assignment cost being an indication of a preference for a task to be processed on one or more of the processors, the index also being related to a task holding cost being an indication of a waiting time for the task; the index also being related to an externality cost being an indication of how existing tasks assigned in the computing cluster are penalized if the task is allocated to the processor;
   selecting a task using the index; and
   scheduling the selected task for allocation to the processor;
   storing assignment costs for pairs of tasks and processors; and
   automatically adjusting the assignment costs on the basis of information about topology of the computing cluster and information about traffic arriving at links connecting processors in the computing cluster.

2. The method as claimed in claim 1 comprising repeatedly scheduling tasks to processors in the computing cluster, monitoring traffic arriving at links in the computing cluster and dynamically adjusting the assignment costs during operation of the computing cluster to process scheduled tasks.

3. The method as claimed in claim 1 comprising automatically adjusting the assignment costs using a target utilization and a capacity for each of a plurality of links in the computing cluster.

4. The method as claimed in claim 1 comprising setting the externality cost to zero.

5. The method as claimed in claim 1 comprising monitoring task waiting times and computing a task holding cost using a specified relation with the monitored task waiting times.

6. The method as claimed in claim 1 comprising estimating the externality cost using a congestion measure at links between processors in the computing cluster.

7. The method as claimed in claim 6 wherein the congestion measure is a packet loss rate per link.

8. A computer-implemented method of scheduling a task to a processor in a computing cluster comprising a plurality of processors, the method comprising:
   monitoring a congestion measure at links between processors in the computing cluster;
   for each of a plurality of tasks available for allocation to the processor;
      computing an index related to at least an externality cost being an indication of how existing tasks assigned in the computing cluster are penalized if the task is allocated to the processor; estimating the externality cost using the congestion measure;
   selecting a task using the index; and
   scheduling the selected task for allocation to the processor;
   computing the index using an assignment cost for the task, the assignment cost being an indication of a preference for the task to be processed on one or more of the processors; and
   automatically adjusting the assignment cost on the basis of information about topology of the computing cluster and information about traffic arriving at links connecting processors in the computing cluster.

9. The method as claimed in claim 8 wherein monitoring the congestion measure comprises monitoring a packet loss rate per link.

10. The method as claimed in claim 8 which comprises computing the index using a task holding cost being a cost of a delay in scheduling the task.

11. A scheduler for scheduling a task to a processor in a computing cluster comprising a plurality of processors, the scheduler comprising:

one or more processors configured to provide an index generator arranged, for each of a plurality of tasks available for allocation to the processor, to compute an index related to an assignment cost for the task, the assignment cost being an indication of a preference for a task to be processed on one or more of the processors, the index also being related to a task holding cost being an indication of a waiting time for the task;

the index also being related to an externality cost being an indication of how existing tasks assigned in the computing cluster are penalized if the task is allocated to the processor;

an allocator arranged to select a task using the index and allocate the selected task to the processor; and an assignment cost engine arranged to dynamically adjust the assignment cost during operation of the scheduler using information about topology of the computing cluster and information about traffic arriving at links connecting processors in the computing cluster.

12. The scheduler as claimed in claim 11 comprising an input from a monitor arranged to monitor traffic arriving at links in the computing cluster.

13. The scheduler as claimed in claim 11 wherein the assignment cost engine is arranged to automatically adjust the assignment costs using a target utilization and a capacity for each of a plurality of links in the computing cluster.

14. The scheduler as claimed in claim 11 wherein the index generator is arranged to estimate the externality cost using a congestion measure at links between processors in the computing cluster.

15. The scheduler as claimed in claim 11 wherein the index generator is arranged to estimate the externality cost using a packet loss rate per link between processors in the computing cluster.

16. The computing cluster comprising a scheduler as claimed in claim 11.

* * * * *